(12) United States Patent
Stevenson et al.

(10) Patent No.: US 7,698,311 B2
(45) Date of Patent: Apr. 13, 2010

(54) METHOD AND SYSTEM FOR AUGMENTING AND TRACKING WEB CONTENT

(75) Inventors: Douglas Stevenson, San Francisco, CA (US); Craig Allen Gooding, London (GB)

(73) Assignee: Vibrant Media Limited, London (GB)

( * ) Notice: Subject to any disclaimer, the term of this patent is extended or adjusted under 35 U.S.C. 154(b) by 408 days.

(21) Appl. No.: 11/779,254

(22) Filed: Jul. 17, 2007

(65) Prior Publication Data

US 2008/0021895 A1 Jan. 24, 2008

Related U.S. Application Data

(63) Continuation of application No. 10/645,313, filed on Aug. 20, 2003, now Pat. No. 7,257,585.

(60) Provisional application No. 60/484,818, filed on Jul. 2, 2003.

(51) Int. Cl.
- G06F 7/00 (2006.01)
- G06F 17/00 (2006.01)
- G06F 17/30 (2006.01)
- G06F 12/00 (2006.01)

(52) U.S. Cl. .................... 707/602; 707/821; 707/959

(58) Field of Classification Search .............. 707/9, 707/10, 100, 101, 200

See application file for complete search history.

(56) References Cited

U.S. PATENT DOCUMENTS

| | | | |
|---|---|---|---|
| 5,204,947 A | 4/1993 | Bernstein et al. | |
| 5,251,294 A | 10/1993 | Abelow | |
| 5,694,594 A | 12/1997 | Chang | |
| 5,708,825 A | 1/1998 | Sotomayor | |
| 5,751,961 A | 5/1998 | Smyk | |

(Continued)

FOREIGN PATENT DOCUMENTS

EP 0778534 B1 9/2002

(Continued)

OTHER PUBLICATIONS

Irwin, T. et al., "ValueClick To Launch Predictive Behavioral Targeting," Jul. 21, 2008, [online] [Retrieved on Aug. 14, 2008] Retrieved from the Internet<URL:http://www.mediapost.com/publications/?fa=Articles.san&s=86905&Nid=45235&p=118697>.

(Continued)

Primary Examiner—Wilson Lee
Assistant Examiner—Cheryl M Shechtman
(74) Attorney, Agent, or Firm—Fenwick & West LLP (57) ABSTRACT

A system for augmenting data from a source data file with data from a reference database to generate an augmented data file and tracking the augmented data file is provided. The system includes a reference database including at least one reference datum. A handler component is configured to retrieve a source data file including the structured datum. A locator component is configured to locate the structured datum in the source data file; an analyzer component configured to associate the identified structured datum to one reference datum to create an association according to an analyzing strategy. A generating component is configured to generate a hyperlink based upon the association and embeds the generated hyperlink and an identification code in the source file to create and track an augmented data file.

20 Claims, 8 Drawing Sheets

U.S. PATENT DOCUMENTS

| | | |
|---|---|---|
| 5,764,906 A | 6/1998 | Edelstein et al. |
| 5,794,257 A | 8/1998 | Liu et al. |
| 5,815,830 A | 9/1998 | Anthony |
| 5,822,539 A | 10/1998 | Van Hoff |
| 5,848,396 A | 12/1998 | Gerace |
| 5,857,181 A | 1/1999 | Augenbraun et al. |
| 5,903,889 A | 5/1999 | de la Huerga et al. |
| 5,948,061 A | 9/1999 | Merriman et al. |
| 5,963,205 A | 10/1999 | Sotomayor |
| 5,991,735 A | 11/1999 | Gerace |
| 5,991,809 A | 11/1999 | Kriegsman |
| 5,999,912 A | 12/1999 | Wodarz et al. |
| 5,999,929 A | 12/1999 | Goodman |
| 6,092,074 A | 7/2000 | Rodkin et al. |
| 6,098,065 A | 8/2000 | Skillen et al. |
| 6,098,081 A | 8/2000 | Heidorn et al. |
| 6,108,703 A | 8/2000 | Leighton et al. |
| 6,185,598 B1 | 2/2001 | Farber et al. |
| 6,434,567 B1 | 8/2002 | de la Huerga et al. |
| 6,507,837 B1 | 1/2003 | de la Huerga et al. |
| 6,516,321 B1 | 2/2003 | de la Huerga et al. |
| 6,574,644 B2 | 6/2003 | Hsu et al. |
| 6,581,065 B1 | 6/2003 | Rodkin et al. |
| 6,748,385 B1 | 6/2004 | Rodkin et al. |
| 6,928,452 B2 | 8/2005 | De La Huerga |
| 7,305,625 B1 | 12/2007 | Zilka et al. |
| 7,437,725 B1 | 10/2008 | Chang et al. |
| 2005/0125397 A1 | 6/2005 | Gross et al. |
| 2005/0131884 A1 | 6/2005 | Gross et al. |
| 2006/0064411 A1 | 3/2006 | Gross et al. |
| 2006/0248078 A1 | 11/2006 | Gross et al. |
| 2006/0282416 A1 | 12/2006 | Gross et al. |
| 2007/0050711 A1 | 3/2007 | Walker et al. |
| 2008/0195603 A1 | 8/2008 | Gross et al. |
| 2009/0031311 A1 | 1/2009 | Chang et al. |
| 2009/0171750 A1 | 7/2009 | Zhou et al. |
| 2009/0171751 A1 | 7/2009 | Zhou et al. |

FOREIGN PATENT DOCUMENTS

| | | |
|---|---|---|
| JP | 2000-276471 | 10/2000 |
| JP | 2002-133281 | 5/2002 |
| JP | 2003-108425 | 4/2003 |
| WO | WO 01/86390 A2 | 11/2001 |

OTHER PUBLICATIONS

Andreessen, M., "two ideas . . . ", Dec. 14, 1992, [online][Retrieved on Feb. 6, 2001] Retrieved from the Internet<URL:http://lists.w3.org/Archives/Public/www-talk/1992NovDec/0207.html>, pp. 1-2.

Raggett, D., "Different forms of Annotations", Nov. 23, 1992, [online][Retrieved on Feb. 6, 2001] Retrieved from the Internet<URL:http://lists.w3.org/Archives/Public/www-talk/1992NovDec/0100.html>, pp. 1-2.

Chinese Office Action, Chinese Application No. 200480023822.6, Mar. 2008, 9 pages.

European Office Action, European Application No. 04756575.9, Jan. 21, 2008, 4 pages.

Japanese Office Action, Japanese Application No. 2006-517836, Feb. 19, 2008, 4 pages.

Agosti, M. et al., "Automatic Authoring and Construction of Hypermedia for Information Retrieval," Multimedia Systems, Feb. 1995, pp. 1-19, vol. 3, No. 1, Springer Berlin.

Allan, J., "Automatic Hypertext Construction," Dissertation, Cornell University, Jan. 1995, 128 pages.

Carr, L. et al., "The Evolution of Hypertext Link Services," ACM Computing Surveys, Dec. 1999, vol. 31, No. 4, [Online] [Retrieved on Mar. 31, 2009] Retrieved from the Internet <URL: http://www.cs.brown.edu/memex/ACM_HypertextTestbed/papers/19.html>, pp 1-10.

Carr, L. et al., "The Microcosm Link Service and its Application to the World Wide Web," In Proceedings of the First International World Wide Web Conference Geneva, 1994, pp. 1-9.

"Cisco DistributedDirector," Posted Feb. 21, 1997, 16 pages, [Online] [Retrieved on Dec. 4, 1997] Retrieved from the Internet<URL:http://www.cisco.com/wart/public/751/distdir/dd_wp.htm>.

Crestani, F. et al., "A Case Study of Automatic Authoring: from a Textbook to a Hyper-Textbook," Submitted to Elsevier Preprint, Oct. 13, 1997, pp. 1-34.

Goldszmidt, G. et al., "Load Distribution for Scalable Web Servers: Summer Olympics 1996—A Case Study," 10 pages.

Holm, R., "A Trip Down Hypermedia Lane," Linux Gazette, May 2002, Issue 78, [Online] [Retrieved on Mar. 31, 2009] Retrieved from the Internet<URL:http://linuxgazette.net/issue78/holm.html>, pp.1-10.

Li, Z. et al., "Hypermedia Links and Information Retrieval," Conference, Lancaster University, 1992, pp. 1-11.

Mayfield, J. et al., "Snitch: Augmenting Hypertext Documents with a Semantic Net," International Journal of Intelligent and Cooperative Information Systems, 1993, pp. 1-17.

Thistlewaite, P., "Automatic Construction and Management of Large Open Webs," Information Processing & Management, 1997, pp. 161-173, vol. 33, No. 2.

Yang, J. et al., "From Hypertext to Flat Text: A Tool for Document Construction," AusWeb96, 1996, 9 pages.

Sounds like you stopped it dead in its tracks. You could do a second virus scan at HOUSE CALL at the Trend Micro website if that would ease your mind. Brian, if you are going to use KAZAA, remember to be very cautious and scan evrything. As many people that try to help people at this security area know full well, there are virus/trojans/worms that are only available by using KAZAA!

Sounds like you stopped it dead in its tracks. You could do a second virus scan at HOUSE CALL at the Trend Micro website if that would ease your mind. Brian, if you are going to use KAZAA, remember to be very cautious and scan evrything. As many people that try to help people at this security area know full well, there are virus/trojans/worms that are only available by using KAZAA!

FIG. 5

| | | | |
|---|---|---|---|
| music | Have Fun with Lola. | | http://www.x10.com/products/lola_sg1.htm |
| * | * | * | |
| security | Cisco. This is the power of the network. Now. | | http://www.cisco.com/ |
| * | * | * | |
| surveillance | Vanguard: The Ultimate Camera | | http://www.x10.com/products/vanguard_sg1.htm?jx10van1 |

METHOD AND SYSTEM FOR AUGMENTING AND TRACKING WEB CONTENT

CROSS-REFERENCE TO RELATED APPLICATIONS

This application is a continuation of U.S. patent Ser. No. 10/645,313, filed on Aug. 20, 2003, now U.S. Pat. No. 7,257,585, which claims benefit of U.S. Provisional Patent Application Ser. No. 60/484,818, filed on Jul. 2, 2003, both of which are hereby incorporated by reference in their entirety.

BACKGROUND OF THE INVENTION

Hypertext is the organization of computer-based text into connected associations enabling a user to quickly access information that the user chooses. An instance of such an association is called a hyperlink or hypertext link. Hypertext was the main concept that led to the invention of the World Wide Web, which is nothing more than an enormous amount of information content connected by an enormous number of hyperlinks.

While the hyperlink has proven to be a successful means of relating two pieces of information, the process of generating hyperlinks has proven to be generally tedious. To create a single link, the process requires an author to define such portions, usually a text string or photo element of a structured file (usually a text document, web page, or other form of document) from which the hyperlink originates and a destination address at which the hyperlink terminates. In a closed system such as in a local network of workstations, the destination might be within the same file, directory, or computer, or the destination may be a designated file within a designated directory on the network.

Even with the required information, the knitting together of hyperlinks still requires some skill. The would-be author of a document with suitable links must first identify the content of the file the author seeks to augment and then must use an appropriate application to edit the file. Generally, the MIME header embedded in the file identifies the file type. The embedded header allows a computer software product to recognize the data by virtue of its Multi-Purpose Internet Mail Extensions ("MIME") type. MIME is an extension of the original Internet e-mail protocol that lets people use the protocol to exchange different kinds of data files on the Internet including audio, video, images, application programs, and other kinds, including text generally in the ASCII format. Once identified, the file is opened for review using the appropriate application as identified by the MIME header.

When the network is broader, such as on the Internet, static addresses on the Internet may be used as destinations. A Uniform Resource Locator is the address of a file (resource) accessible on the Internet. The type of resource depends on the Internet application protocol. Using the World Wide Web's protocol, Hypertext Transfer Protocol (HTTP), the resource can be an HTML page, an image file, a program such as a common gateway interface application or Java applet, or any other file type supported by HTTP. The URL contains the name of the protocol required to access the resource, a domain name that identifies a specific computer on the Internet, and presents a hierarchical description of a file location on the computer.

For this reason, the content of resources may not have all of the links that would be useful. Old data might direct browsers to addresses where no data is now stored. "Link rot," describes a gradual loss of data at URL's linked to documents. This gradual loss occurs when a destination document is removed while the link in an originating document to the destination document remains. The reader receives a "404 message," an arbitrarily assigned code indicating that the page to which the reader has directed the browser no longer exists at the designated address. Another form of link rot occurs when the destination page has been changed in content and is no longer relevant according to the sending description.

Where parties, such as advertisers, wish to inject links into existing resources in order to direct the reader's browser to designated resources, it is critical that the links remain current. Because files are static, links that are old will not complete the hyperlink transit and therefore will lose the benefit of the hyperlink. Fixedly embedding links in the file subjects the file to link rot.

There is, therefore, an unmet need in the art for a publishing system and method for augmenting resources and maintaining suitable current hyperlinks within the resources.

SUMMARY OF THE INVENTION

A system for augmenting data from a source data file with data from a reference database to generate an augmented data file and tracking the augmented data file is provided. The system includes a reference database including at least one reference datum. A handler component is configured to retrieve a source data file including the structured datum. A locator component is configured to locate the structured datum in the source data file; an analyzer component configured to associate the identified structured datum to one reference datum to create an association according to an analyzing strategy. A generating component is configured to generate a hyperlink based upon the association and embeds the generated hyperlink and an identification code in the source file to create and track an augmented data file.

One presently preferred embodiment includes a system for augmenting file content, including web content, with hyperlinks to designated destinations. The system works based on finding a datum (a data subset of a file) within a file, recognizing the datum based upon the contents of a reference database, associating the datum with a designated resource (in a presently preferred embodiment by means of a uniform resource locator address) and generating a hyperlink in the data source file.

The generated hyperlink (in a presently preferred embodiment) receives a user-friendly name based on the contents of the resource located at the uniform resource locator address. The an embodiment is a add-on to a browser allowing the browser to augment files "on the fly," i.e. where the user directs the browser to a resource located on a network, the method analyzes the file as it is opened by the browser, augments the file with appropriate hyperlinks, and displays the augmented file with active hyperlinks. "Clicking on" the hyperlink will redirect the browser to the associated uniform resource locator address.

Another presently preferred embodiment provides a rigorous procedure for augmenting files that assures that a greater number of hyperlinks are more uniformly applied than is the rule with human authoring of hyperlinks. A reference database can check the content of the file and will always place a hyperlink where appropriate based upon context. Because the reference database can be readily updated, the invention assures that redirection to current resources, preventing the dead link, i.e. "Error 404, file not found."

A presently preferred embodiment provides a method and a software product to add advertisements to existing web content by hyperlinking occurrences of structured data such as text strings to resources located at a uniform resource locator address.

As will be readily appreciated from the foregoing summary, the invention provides a system and a method for rapidly and for rigorously augmenting files with hyperlinks.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, a system for augmenting data from a source data file with data from a reference database to generate an augmented data file is provided. The system includes a reference database including at least one reference datum. A handler component is configured to retrieve a source data file including the structured datum. A locator component is configured to locate the structured datum in the source data file; an analyzer component configured to associate the identified structured datum to one reference datum to create an association according to an analyzing strategy. A generating component is configured to generate a hyperlink based upon the association and embeds the generated hyperlink in the source file to create an augmented data file.

Figure 1:
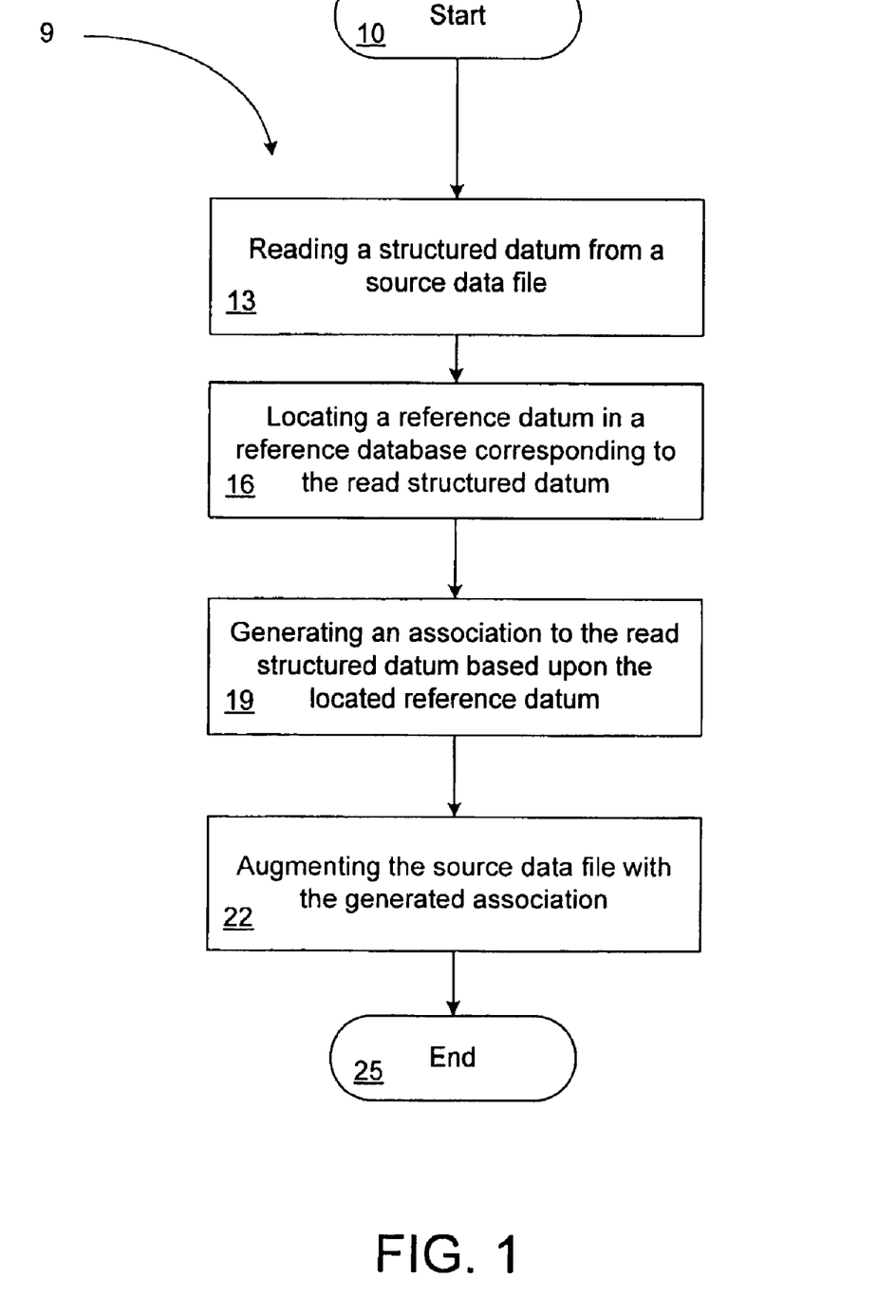
FIG. 1 is a flowchart of the method for augmenting source data files.

FIG. 1 is a flowchart of the method 9 for augmenting source data files. At an appropriate starting terminus 10, the method begins by reading a structured datum from a source data file at a block 13. The source data file may be one designated by an input uniform resource locator address or by any suitable means to designate a resource. Upon opening, the method 9 may optionally identify the type of content on the page with a content identifier such as a MIME header. In one embodiment of the invention, the method 9 merely searches for the presence of a reference datum, either informed by the content identifier or by simply searching an occurrence of a well-structured datum within a given file. However, once the file is open, the method has the contents of the file available for comparison to a reference database.

At a block 16, the method 9 locates an occurrence of a reference datum corresponding to the structured datum read in the source data file. One presently preferred means of discerning the correspondent relation between the structured datum and the reference datum is by a JavaScript call made to a web-enabled database. The Java script then compares the contents of the source data file with reference data stored in a web-enabled reference database. In one presently preferred embodiment, the reference and structured data are keywords. The JavaScript code then extracts the text from the document and converts all of the keywords in the document to hyperlinks.

Other analyzing strategies are also available. Though keywords are a facile and efficient means of generating hyperlinks. One presently preferred embodiment uses a "fuzzy expert" or a neural network analysis of the source data file, such as by a natural language search of the document to generate a distinct identifier for the content in the source data file. One advantage of a natural language search is the ability to better place content in context making links more contextually appropriate, for instance, security might relate to security of a physical plant such as security of a residence in one source data file in one context and security of a website in another. Natural language searches, however, create a large processing overhead, making them less desirable where such resources are at a premium.

At a block 19, the method 9 generates an association based upon the located reference datum in the reference database. The reference datum will include not only the identifier, such as a keyword in one embodiment, but also the associated uniform resource locator address of the intended destination based upon the occurrence of the identifier in the source data file. Generating an association means to hyperlink the located structured datum in the source data file to the associated uniform resource locator as found in the reference datum in the reference database. The generated hyperlink might optionally include a user-friendly description of the content of the resource found at the associated uniform resource locator address and additionally might include an additional identification code such as an "advertiser id." In each embodiment, the generated hyperlink is added to the original source data file at a block 22 resulting in an augmented data file. Having generated the augmented data file, the method 9 then terminates at a block 25.

Figure 2:
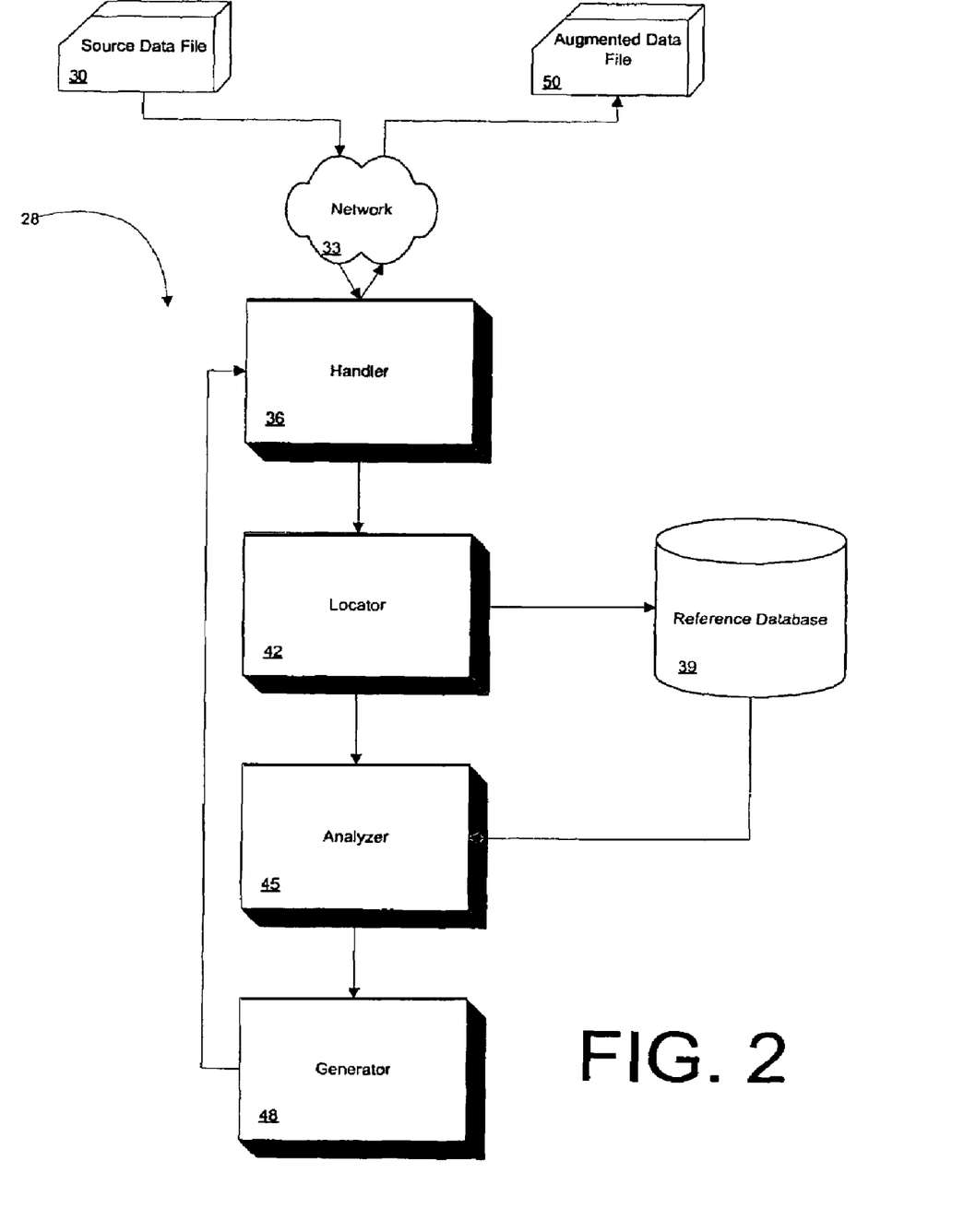
FIG. 2 is a block diagram of a system for augmenting source data files.

FIG. 2 is a block diagram of a system for augmenting source data files. In this exemplary system, a network 33 is shown in a presently preferred embodiment. Those skilled in the relevant art will readily appreciate that the system may be practiced without the presence of a network link. Also a reference database 39 is shown as directly connected to the locator 42 and the analyzer 45. The system is not compromised by network links to any of the several components. One presently preferred embodiment has the reference database 39 set on a web-enabled page for remote calls through the Internet to the database. Like the presence of the network 33 described above, the absence of a defined link through the Internet does not compromise the operation of the method.

A source data file 30 resides on a server on a network 33. A handler 36 retrieves the source data file 30 for use by the system. A locator 42 examines the retrieved source data file 30 for comparison to the reference database 39 according to an analyzing strategy. The locator 42 designates found structured data from the source data file 30 and found reference data from the reference database 39 and provides the reference data to an analyzer 45.

The analyzer 45 is used to create associations between each found structured datum and the uniform resource locator address within the corresponding reference datum found by the locator 42. These associations define the nature of a hyperlink a generator 48 generates according to the association created at the analyzer 45. The generator 48 embeds these hyperlinks in the source data file 30. The resulting augmented data file 50 is returned to the handler 36 to reside at a uniform resource locator address on the network 33.

Figure 3:
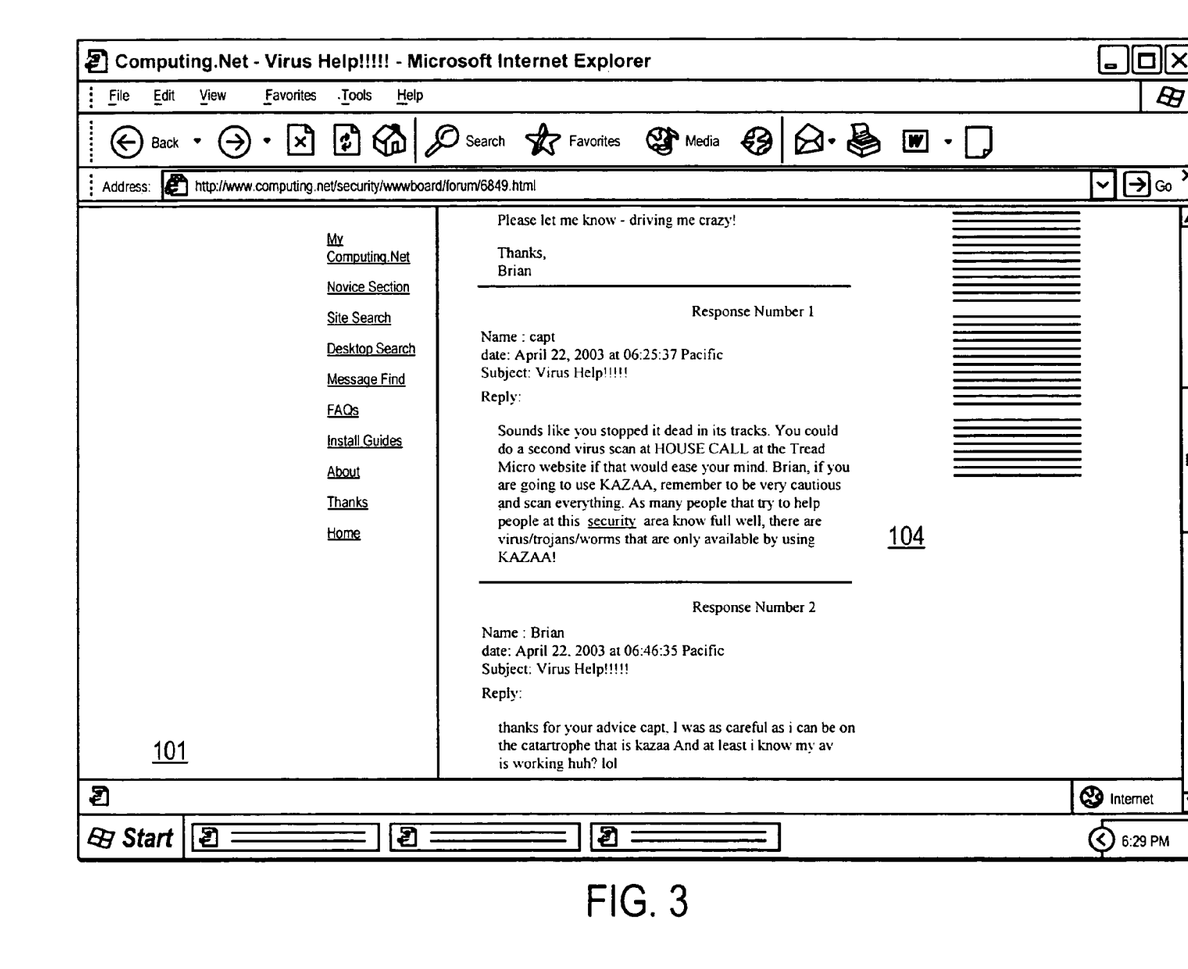
FIG. 3 is screen shot of a source data file selected for augmentation.

FIG. 3 is a screen shot 101 of contents of a source data file 30 (FIG. 2) selected for augmentation. For the purposes of this exemplary discussion, a block of text 104 is selected by the method for augmentation. The present invention does not require the opening of the source data file 30 in a browser however for the purposes of illustration, the screen shot 101 is provided herein.

Figure 4:
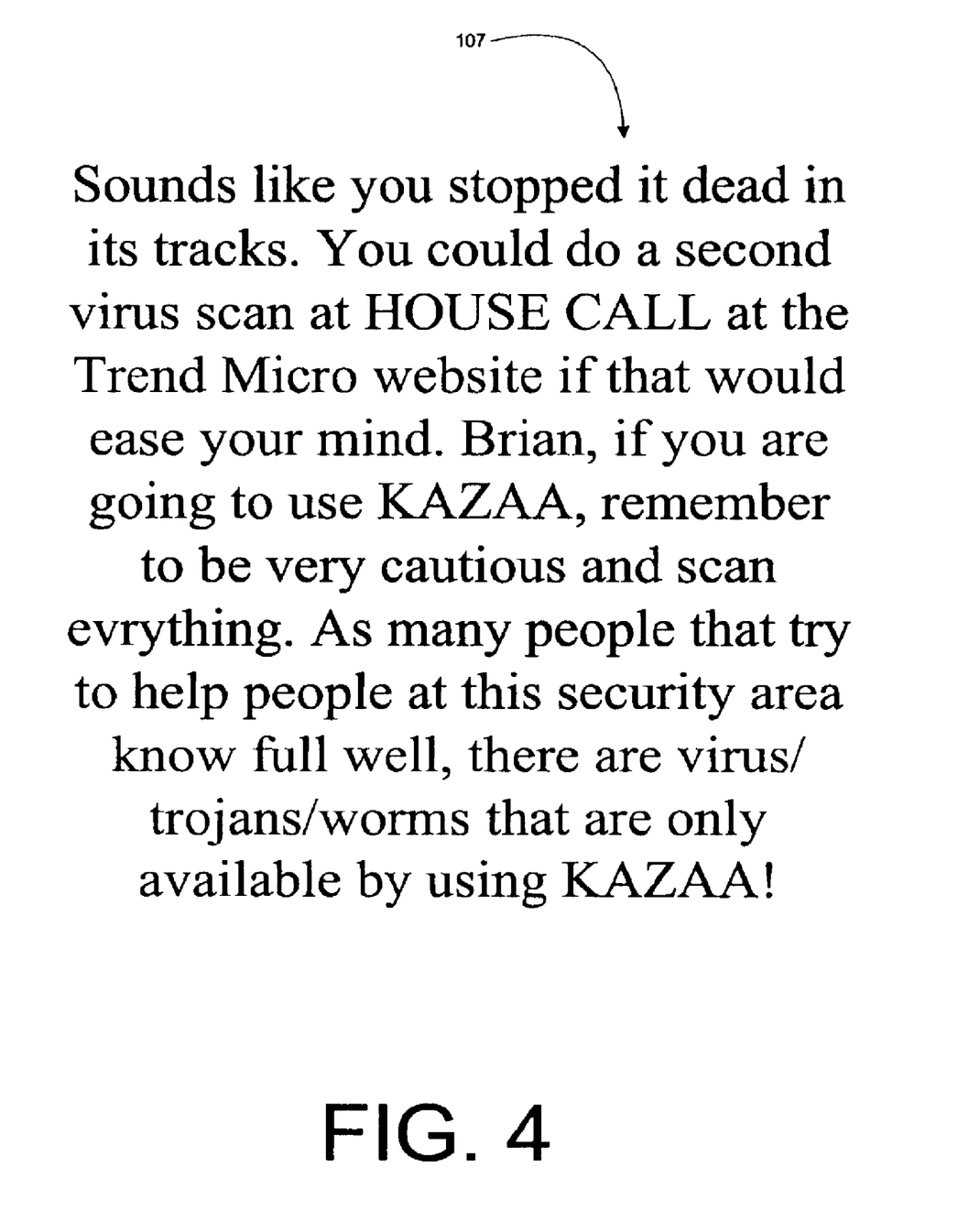
FIG. 4 is a block of text selected for augmentation.

FIG. 4 is a block of text 107 selected for augmentation. The locator 42 (FIG. 2) begins its analysis of the selected block by isolating the block of text 107 as structured data.

Figure 5:
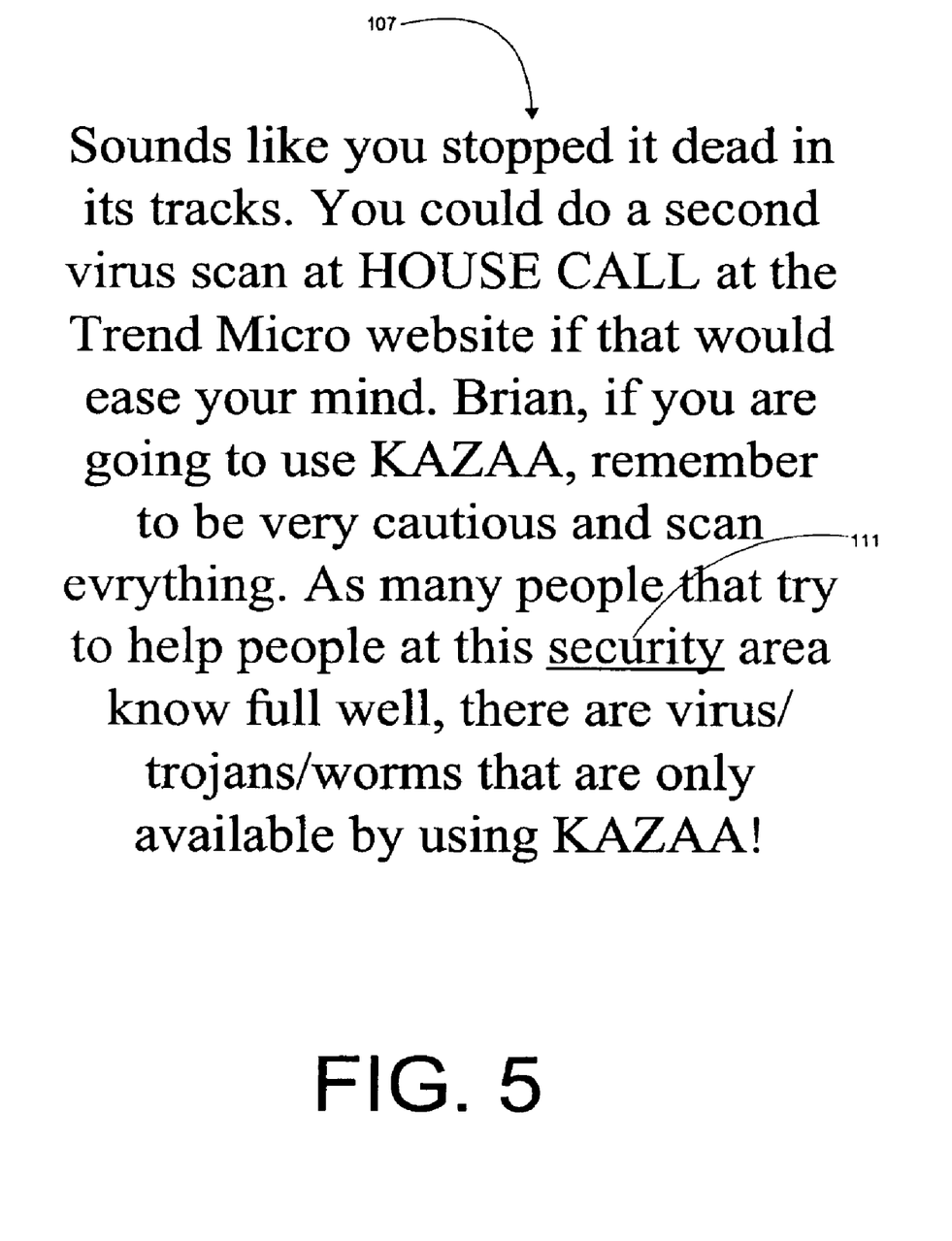
FIG. 5 is the block of text selected for augmentation based upon the occurrence of a text string.

FIG. 5 is the block of text 107 selected for augmentation indicating the occurrence of a text string 111. The locator 42 isolates the occurrence of the text string 111 because of its presence in the reference database 39.

Figure 6:
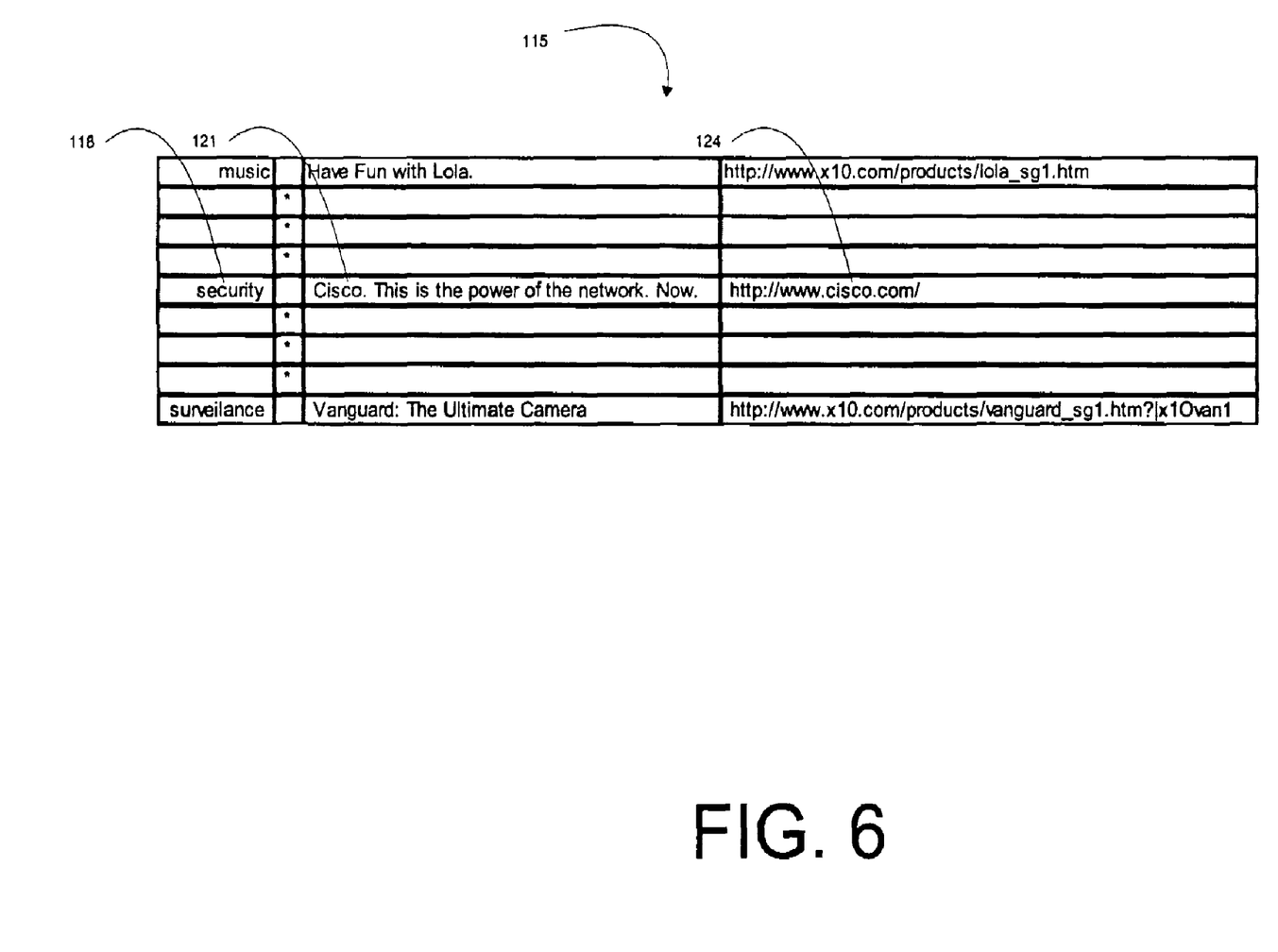
FIG. 6 is an excerpt of an exemplary reference database.

Referring to FIGS. 2 and 6, while the excerpt 115 of the exemplary reference database 39 shows it to be a "flat file" database, any database 39, relational, flat file, or other configuration will suitably fulfill the basic functions of associating an identifier such as a text string 118, with a uniform resource locator address 124, and optionally a user-friendly description 121 of the contents of the file found at the associated uniform resource locator address 124. (Not shown is the optional "advertiser id.")

The locator 42 (FIG. 2) refers to the database as it reviews the contents of the source data file 30 (FIG. 2). According to the analyzing strategy, the text string 118 occurs at a reference datum in the source data file 30, the locator 42 provides the uniform resource locator 124 associated with the found text string 118 along with the occurrence of the text string in the reference datum to the analyzer 45. Upon receiving the ordered pair from the locator address 42, the analyzer 45 creates the association. With the association from the analyzer 45, the generator 48 creates a hyperlink. As a result, the text block receives the appropriate hyperlink.

Figure 7:
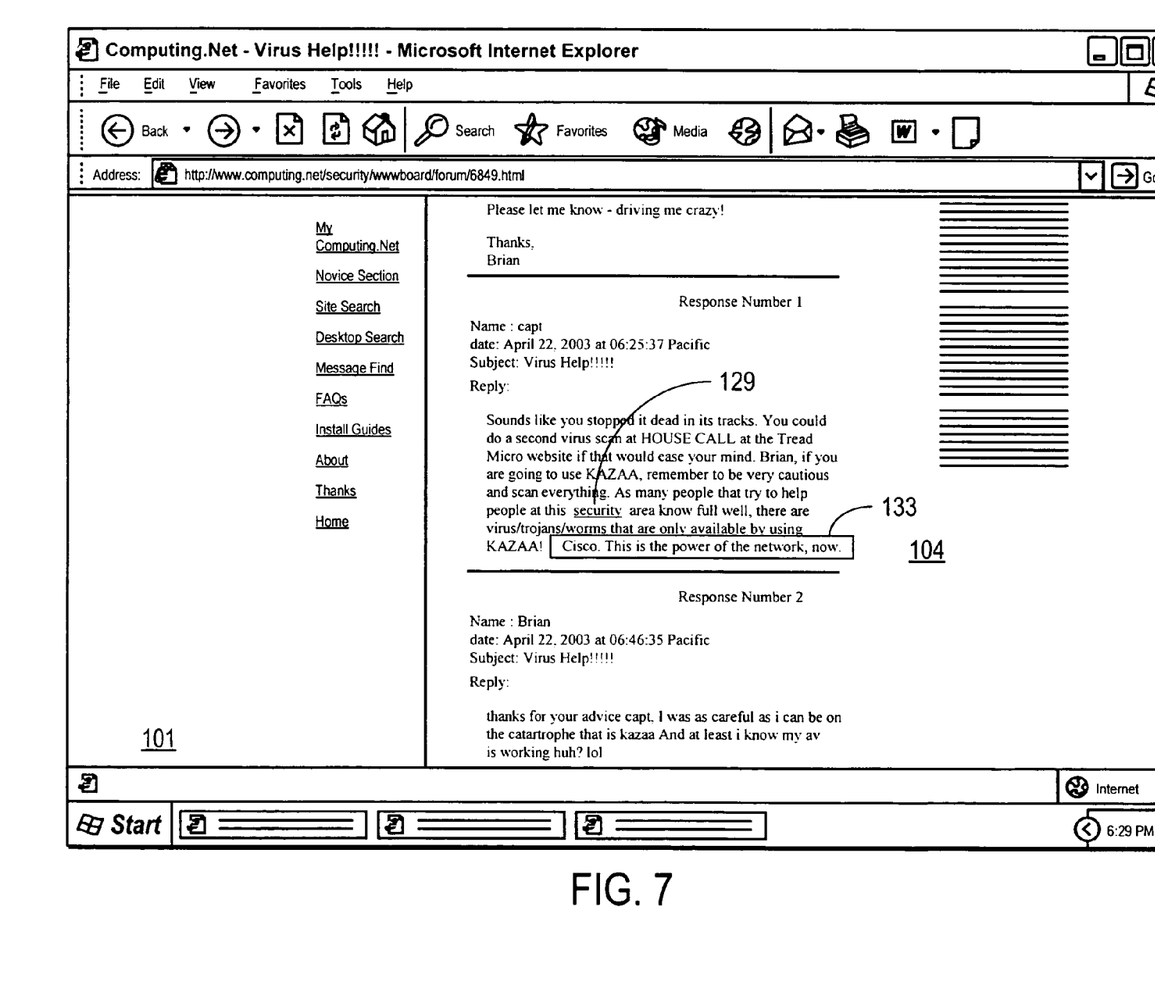
FIG. 7 is a screen shot of the source data file selected for augmentation showing hyperlink and associated user-friendly name.

FIG. 7 is a screen shot 101 of the augmented data file 50 showing the selected block of text 104, hyperlink 129, and associated user-friendly name 133. As will readily be appreciated by those skilled in the relevant art, the augmented data file 50 need not reside on a network. For instance, where a browser is enhanced with the inventive method 9 (FIG. 1), the browser might be directed to content on the Internet. Upon opening the source data file 30 (FIG. 2), the browser will effect the method 9 (FIG. 1) such that rather than displaying the contents of the source data file 30, the browser will display the augmented data file 50. The resulting augmented files 50 would be current at the time of viewing. In a publisher embodiment, the advertiser might continually files on the network, replacing augmented files on the network.

The augmented data file 50 is displayed as set forth in FIG. 7. When a reader places the mouse cursor over the hyperlink 129, a new layer for display showing the associated user-friendly name 133 may be optionally evoked. The "advertiser id" may be optionally embedded but not necessarily visible, the advertiser id. This advertiser id specifically provides a means for tracking the number of times the hyperlink 129 is activated and generating a record for tracking revenue due to advertising. The reader clicks on the hyperlink 129 to direct the browser to a destination file.

Figure 8:
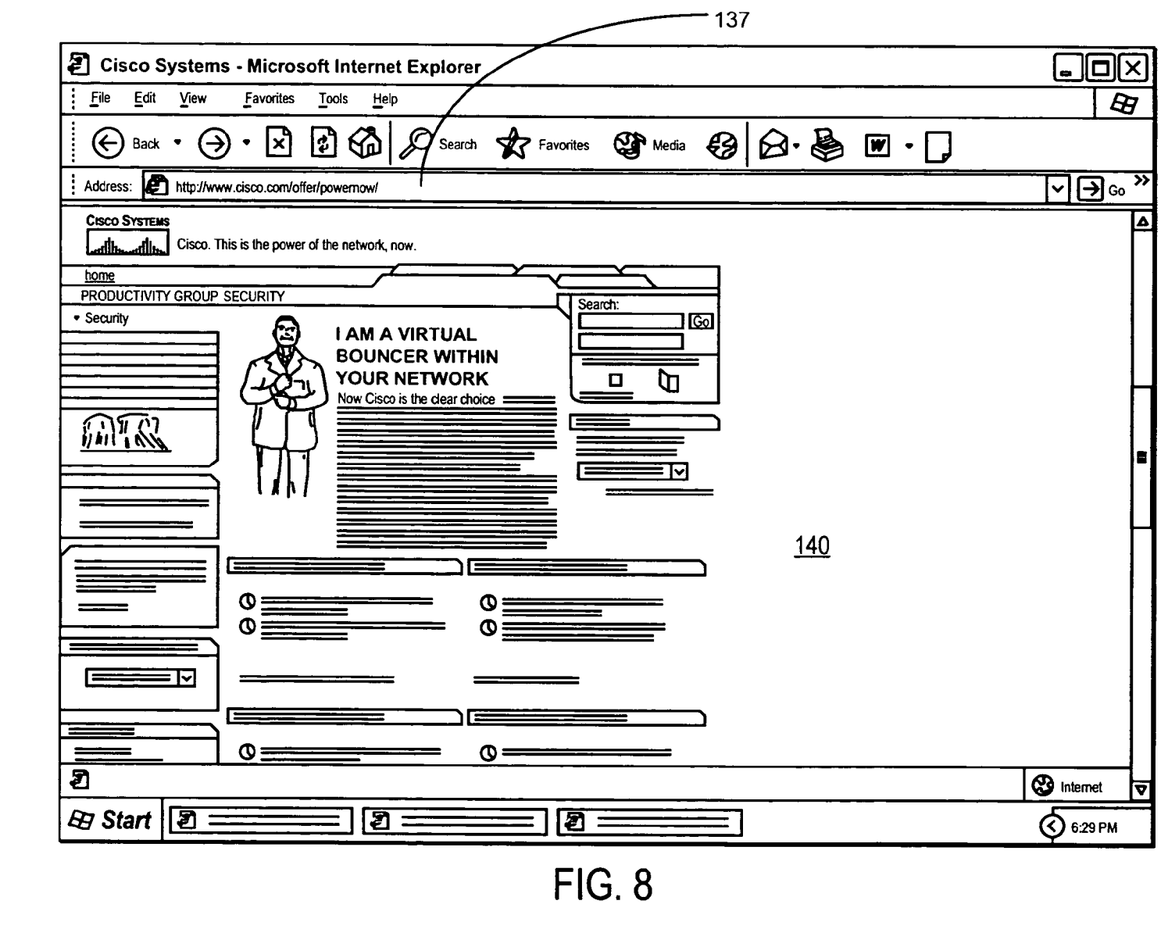
FIG. 8 is a screen shot of the contents of a destination file upon redirection of the browser.

FIG. 8 includes a screen shot 140 of the browser displaying the contents of the destination file located at the uniform resource locator address 137 upon redirection of the browser. When the reader clicks on the hyperlink 129, a new browser window is opened and directed through a click-tracking server to the hyperlink destination.

While the preferred embodiment of the invention has been illustrated and described, as noted above, many changes can be made without departing from the spirit and scope of the invention. For example, the method 9 will generate static files on the network at distinct uniform resource locator addresses 124 and 137 in order to distinguish from the original source data files. Accordingly, the scope of the invention is not limited by the disclosure of the preferred embodiment. Instead, the invention should be determined entirely by reference to the claims that follow.

What is claimed is:

1. A system for augmenting and tracking data files, comprising:
    a reference database including a reference datum;
    a handler component configured to retrieve a source data file including a structured datum;
    a locator component configured to locate the structured datum in the source data file;
    an analyzer component configured to associate the structured datum to the reference datum;
    a generating component configured to embed an association of the structured datum and the reference datum in the source data file to generate an augmented data file, the embedded association including an identification code; and
    a communication component configured to transmit the augmented data file to a computing device, receive a first identifier from the computing device corresponding to a pointer being positioned over the structured datum in the computing device, the first identifier including the identification code, responsive to receiving the first identifier, transmit additional information from the reference database according to the association to the computing device, the additional information being displayable as an overlay in an area proximate to the structured datum simultaneous to the pointer being positioned over the structured datum, receive a second identifier from the computing device corresponding to a user selection of the additional information, and responsive to receiving the second identifier, track the user selection of the additional information.

2. The system of claim 1, wherein the source data file is stored at an address on a network.

3. The system of claim 2, wherein the network is a public network.

4. The system of claim 2, wherein the network is the Internet.

5. The system of claim 1, wherein the source data file comprises a first web page, the augmented data file comprises a second web page generated based on the first web page, and the structured datum comprises at least one word.

6. The system of claim 1, wherein the reference datum includes a first uniform resource locator address.

7. The system as defined in claim 6, wherein the first uniform resource locator address is the location of an advertisement.

8. A software program stored on a computer-readable medium for augmenting and tracking data files, comprising:
    a reference database including a reference datum;
    a handler component configured to retrieve a source data file including a structured datum;
    a locator component configured to locate the structured datum in the source data file;
    an analyzer component configured to associate the structured datum to the reference datum;
    a generating component configured to embed an association of the structured datum and the reference datum in the source data file to generate an augmented data file, the embedded association including an identification code; and
    a communication component configured to transmit the augmented data file to a computing device, receive a first identifier from the computing device corresponding to a pointer being positioned over the structured datum in the computing device, the first identifier including the identification code, responsive to receiving the first identifier, transmit additional information from the reference database according to the association to the computing device, the additional information being displayable as an overlay in an area proximate to the structured datum simultaneous to the pointer being positioned over the structured datum, receive a second identifier from the computing device corresponding to a user selection of the additional information, and responsive to receiving the second identifier, track the user selection of the additional information.

9. The software program of claim 8, wherein the source data file is stored at an address on a network.

10. The software program of claim 9, wherein the network is a public network.

11. The software program of claim 9, wherein the network is the Internet.

12. The software program of claim 8, wherein the source data file comprises a first web page, the augmented data file comprises a second web page generated based on the first web page, and the structured datum comprises at least one word.

13. The software program of claim 8, wherein the reference datum includes a first uniform resource locator address.

14. The software program as defined in claim 13, wherein the first uniform resource locator address is the location of an advertisement.

15. A method for augmenting and tracking data files, comprising:
augmenting a source data file, comprising:
reading a structured datum from the source data file,
locating a reference datum in a reference database corresponding to the structured datum,
generating an association of the reference datum and the structured datum, the association including an identification code, and
augmenting the source data file with the generated association to create an augmented data file;
transmitting the augmented data file to a computing device;
receiving a first identifier from the computing device corresponding to a pointer being positioned over the structured datum in the computing device, the first identifier including the identification code;
responsive to receiving the first identifier, transmitting additional information from the reference database according to the association to the computing device, the additional information being displayable as an overlay in an area proximate to the structured datum simultaneous to the pointer being positioned over the structured datum;
receiving a second identifier from the computing device corresponding to a user selection of the additional information; and
responsive to receiving the second identifier, tracking the user selection of the additional information.

16. The method of claim 15, wherein the source data file is stored at an address on a network.

17. The method of claim 16, wherein the network is a public network.

18. The method of claim 16, wherein the network is the Internet.

19. The method of claim 15, wherein the source data file comprises a first web page, the augmented data file comprises a second web page generated based on the first web page, and the structured datum comprises at least one word.

20. The method of claim 15, wherein the reference datum includes a first uniform resource locator address.

* * * * *